Nov. 2, 1926.  
H. R. BOENNING  
CABLE ATTACHING DEVICE  
Filed Dec. 18, 1925
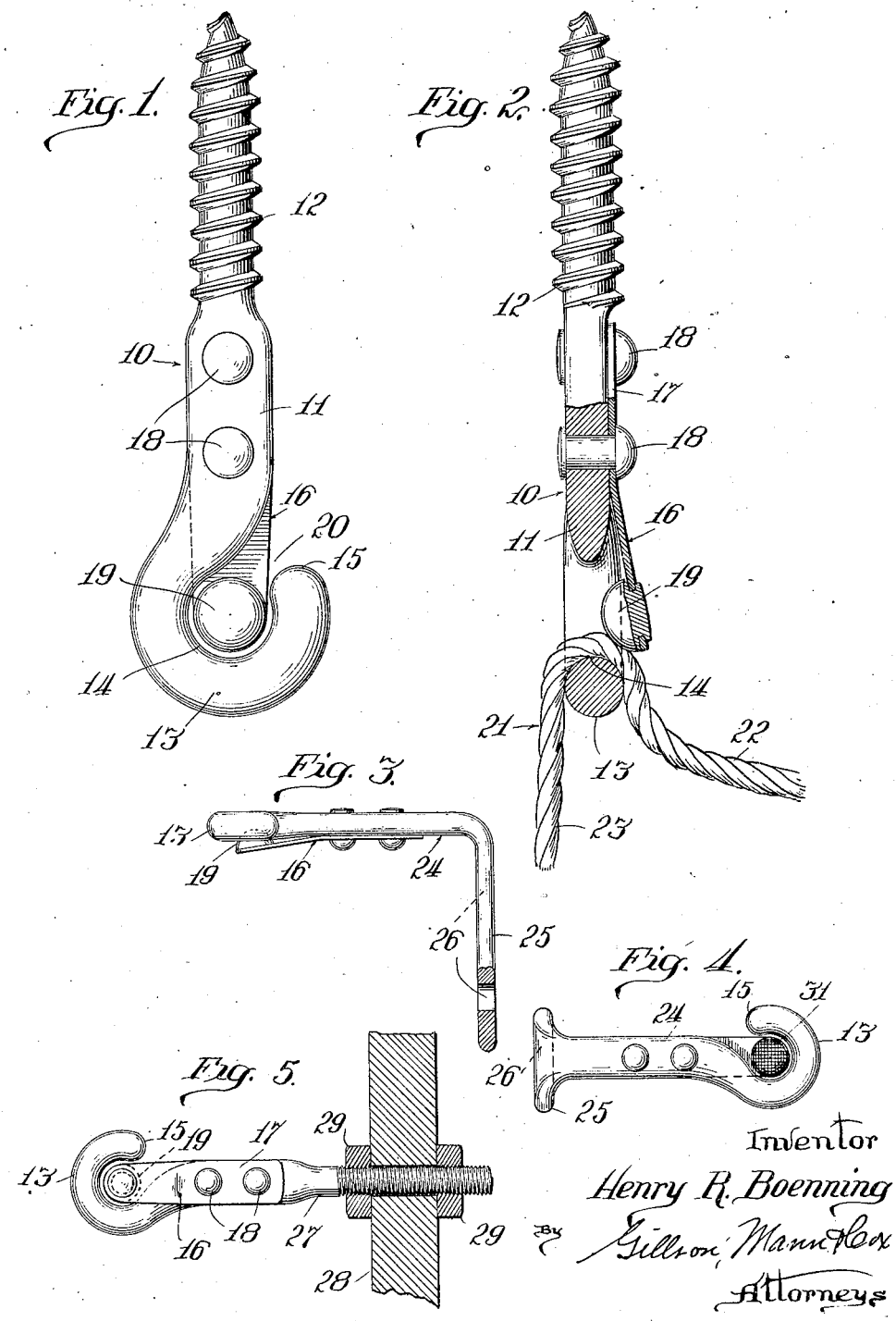
Inventor  
Henry R. Boenning Patented Nov. 2, 1926.

1,605,503

UNITED STATES PATENT OFFICE.

HENRY R. BOENNING, OF MORTON GROVE, ILLINOIS.

CABLE-ATTACHING DEVICE.

Application filed December 18, 1925. Serial No. 76,207.

This invention relates to cable attaching or fastening devices, and the principal object of the invention is the provision of a new and improved means for attaching and securing one end of a cable, rope or other flexible member to an anchoring device.

Another object of the invention is the provision of an anchoring device having new and improved means for clamping a rope, cable or other flexible element against the anchoring device for securely holding the former in adjusted position without injuring the same.

A further object of the invention is the provision of an anchoring member comprising new and improved clamping means so constructed that a cable may be easily inserted in the anchoring device, readily adjusted therethrough and automatically clamped in adjusted position.

A still further object of the invention is the provision of new and improved cable anchoring means that is simple in construction, cheap to manufacture, easily assembled, efficient in operation, one to which a cable may be easily attached and readily adjusted, that will not injure the cable in any way, and that is not likely to become broken or get out of order.

Other and further objects and advantages of the invention will appear from the following description taken in connection with the accompanying drawings, in which Fig. 1 is an elevational view of the device;

Fig. 2 is a view at right angles to that shown in Fig. 1, with parts in section;

Fig. 3 is an elevation of a modified form of the device;

Fig. 4 is a view at right angles to that shown in Fig. 3; and

Fig. 5 is a side elevation of a still further modified form of the device, showing a support therefor in section, with parts broken away.

It has been proposed, in the construction of cable anchoring members, to provide the body portion with an opening and a pivoted clamping member adjacent to said opening, or with a clamping member in the form of a leaf spring adjacent to the opening for gripping the cable, but in these devices, as constructed, it is necessary to thread the cable through the opening in the body portion. Furthermore, the clamping member is so constructed that it tends to cut the cable in holding the same. The present invention seeks to eliminate these difficulties.

On the drawing, the reference numeral 10 designates a cable holding or attaching member which comprises the body portion 11 and a screw-threaded shank 12 for attaching the device to a suitable support. The body portion 11 is provided with a slot 20 adjacent its free end. The slot 20 may be formed in any suitable manner, preferably it is arranged at an angle to the longitudinal axis of the device.

In the form of the device selected to illustrate an embodiment of the invention the body portion 11 is in the form of a hook whereby the curved portion 13 of the hook forms a seat 14 for the cable, and the end 15 of the hook is spaced from the body portion to form the slot 20.

Suitable means are provided for clamping the cable against the seat 14 when the same is inserted through the slot 20. As shown, a cable gripping or engaging member 16 is employed for this purpose. This member is preferably in the form of a yielding element and comprises a leaf spring, one end 17 of which is rigidly connected to the body portion of the device as by means of the rivets 18.

In order to prevent undue wear or cutting of the strands of the cable the free end of the spring has a button or cable engaging member 19 rigidly attached thereto. The button 19 is provided with a curved surface for engaging the cable 21 for holding the same in the seat 14. The parts are so arranged that the button 19 will normally occupy a position within the bend of the hook.

In attaching a cable, as 21, to the holding member, the same is placed over the end of the hook 15 and the end 22 of the cable is pulled down into said slot, forcing the button 19 outwardly. The cable is then pulled until the portion 23 thereof is taut. The resilient retaining member 16 will permit the cable to be pulled through the seat 14 by the end 22 of the cable, but will bite into the cable to prevent the same from sliding through the seat in the opposite direction. When it is desired to release the cable it is only necessary to take hold of the end 22 and pull the same outwardly past the button 19.

The cable engaging member or button 19, which is rigidly connected to the free end of the spring 17, is preferably a spherical segment whereby the cable 21 may be readily forced beneath the curved surface of the same. The button will engage the strands of the rope or cable in a manner similar to a pawl and the frictional engagement between the button and the cable will cause the former to more firmly grip the latter when tension is placed on the portion 23 of said cable.

The form of the device shown in Figs. 3 and 4 differs from that described above in that a different form of attaching means is employed. The body portion 24 is provided with a flattened shank 25 bent at right angles thereto. Suitable openings 26 are provided in the shank 25 through which screws may be inserted for attaching the same to a support.

In the form of the device shown in Fig. 5 the shank 27 is screw-threaded and is adapted to extend through the support 28 and to be held in position by suitable means such as the nuts 29, one on each side of the support.

While I have shown the device in connection with a cable having twisted strands, it is understood that it may be employed in connection with any type of cable or flexible element inasmuch as the friction between the button and the cable will cause the engaging member 16 to clamp the flexible element against the seat 14 and hold the same in adjusted position.

If desired the clamping member or button may be roughened or knurled as shown at 31 in Fig. 4, in order that the same may more firmly grip the rope or other flexible member.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. A rope holding device comprising a body portion having a slot extending into one end thereof, a spring member rigidly connected at one end to said body portion and having its free end provided on the side adjacent to said slot with a transversely curved surface normally extending partially across and into said slot, whereby a cable inserted in said slot may be readily pulled in one direction between said body portion and the curved surface on said spring member and will be engaged by said member for preventing the same from being moved in the other direction through said slot.

2. A cable holding device comprising an open hook, a spring member rigidly connected at one end to said hook and having its free end extending partially across the loop portion of said hook, and a cable gripping member in the form of a spherical segment rigidly attached to the free end of said spring member and normally extending into the loop of said hook.

3. A rope holding member comprising a hook, means for attaching said hook to a support, a yielding rope engaging member secured to one side of said hook and extending partially across the loop of the same, and a button having a curved surface for permitting a rope to be inserted in said hook by a lateral movement, said button permitting the rope to slide through said loop in the direction of said button but preventing the same from moving in the opposite direction.

4. A rope anchoring device comprising a hook-shaped member having means for attaching the same to a support, a spring attached to the shank of the hook-shaped member, and a button having a curved surface secured to said spring and disposed opposite the open eye formed by said hook-shaped member, whereby a cable inserted in said eye will be clamped by said button.

In testimony whereof I affix my signature.

HENRY R. BOENNING.